United States Patent [19]

Wojciak, Jr.

[11] Patent Number: 4,806,930

[45] Date of Patent: Feb. 21, 1989

[54] RADIO CONTROL TRANSMITTER WHICH SUPPRESSES HARMONIC RADIATION

[75] Inventor: Bernard J. Wojciak, Jr., Woodridge, Ill.

[73] Assignee: Chamberlain Manufacturing Corporation, Elmhurst, Ill.

[21] Appl. No.: 188,645

[22] Filed: May 2, 1988

Related U.S. Application Data

[63] Continuation of Ser. No. 891,956, Aug. 1, 1986, abandoned.

[51] Int. Cl.[4] .......................... H04Q 7/00; H04B 1/04
[52] U.S. Cl. .......................... 340/825.69; 331/117 D; 455/129
[58] Field of Search .......................... 340/825.69, 696; 455/114, 129; 331/77, 105, 117 D

[56] References Cited

U.S. PATENT DOCUMENTS

| Re. 29,525 | 1/1978 | Willmott | 340/696 |
| 3,522,536 | 8/1970 | Reynolds | 340/696 |
| 3,665,315 | 5/1972 | Glatzer et al. | 455/129 |
| 3,794,920 | 2/1974 | Darrow | 455/114 |
| 4,086,535 | 4/1978 | Shibata et al. | 455/129 |
| 4,327,444 | 4/1982 | Court | 455/129 |
| 4,355,309 | 10/1982 | Hughey et al. | 340/696 |
| 4,366,482 | 12/1982 | Remes et al. | 455/115 |
| 4,375,621 | 3/1983 | Schneiter et al. | 331/117 D |
| 4,593,412 | 6/1986 | Jacob | 455/129 |

Primary Examiner—Donald J. Yusko

[57] ABSTRACT

A radio control transmitter which suppressed harmonics includes an oscillator which is coded by code selecting switches and in which undesired harmonics are reduced from the output of the transmitter by adding inductors into the emitter, the collector or the base of the radio frequency oscillator.

4 Claims, 1 Drawing Sheet

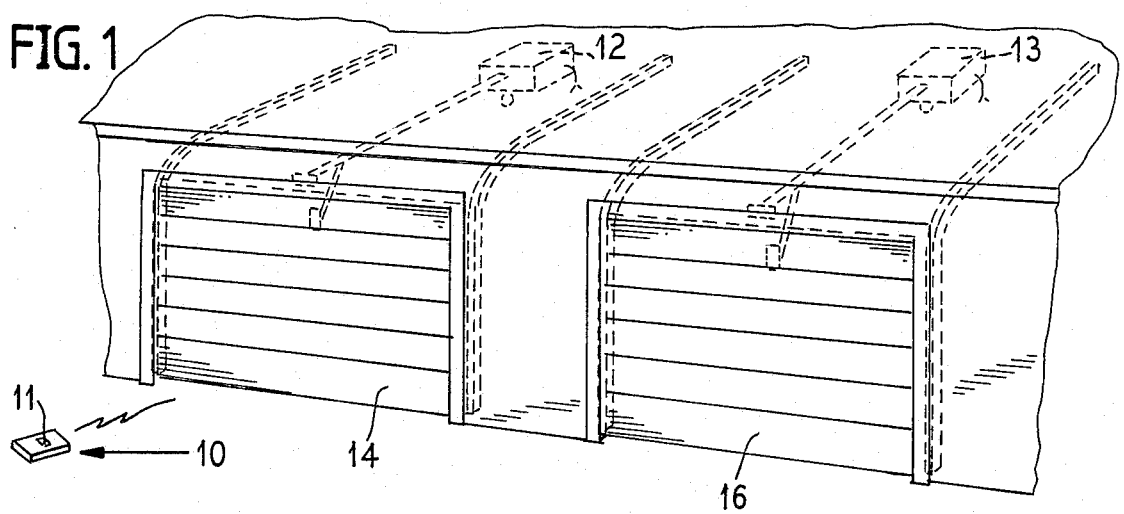
FIG. 1
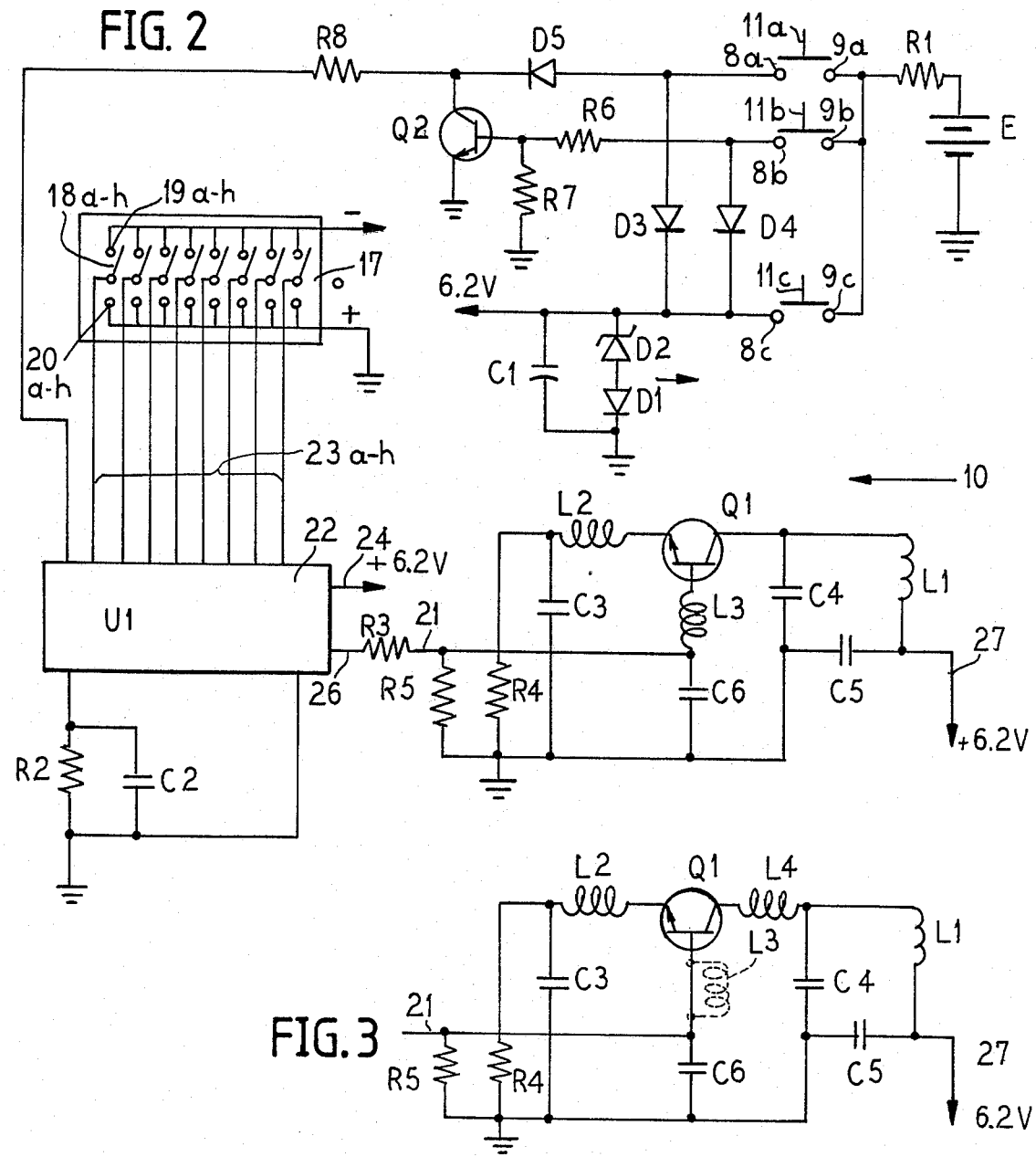
FIG. 2
FIG. 3

4,806,930

RADIO CONTROL TRANSMITTER WHICH SUPPRESSES HARMONIC RADIATION

This is a continuation of application Ser. No. 891,956, filed Aug. 1, 1986, now abandoned.

BACKGROUND OF THE INVENTION

1. Field of the Invention

This invention relates in general to radio control transmitters and in particular to a novel transmitter in which radiation of harmonics is suppressed.

2. Description of the Prior Art

Reissue U.S. Pat. No. 29,525 which issued on Jan. 24, 1978 comprising a reissue of U.S. Pat. No. 3,906,348 which issued on Sept. 16, 1975 entitled "Digital Radio Control" in which the inventor is Colin B. Willmott and which is assigned to the Chamberlain Manufacturing Corporation, the assignee of the present application discloses a digital radio control comprising a transmitter and receiver wherein a plurality of switches may be set in a transmitter to pick a particular code which will be transmitted and wherein a receiver which is set to the same code will detect and actuate a control device as, for example, a garage door operator.

The Federal Communication Commission has been giving consideration to the issuance of a new set of rules and measurement procedures for governing both security alarm devices and garage door radio controls. These new sets of rules and measurement procedures establish higher fundamental emission limits than had previously been available for security transmitters and eliminate the security device duty cycle requirements. The FCC proposal establish lower emission limits for security receivers than had been previously been required and impose new limits on transmitters and receivers with respect to harmonic emissions and "forbidden bands". The Commission also propose the requirement that measurements be made above 1 Ghz and to limit emissions in forbidden bands to 125 microvolts/m above 1 Ghz. Since garage door operators operate in the 300-400 MHz bands, the proposed FCC requirements would be very expensive for manufacture of garage door controls.

SUMMARY OF THE INVENTION

The present invention relates to a transmitter for a radio control transmmitter as, for example, garage door operators which suppresses harmonics and spurious radiation in undesired bands.

It is an object of the present invention to provide a radio control transmitter in which undesired harmonics and spurious frequencies are suppressed.

Other objects, features, and advantages of the invention will be readily apparent from the following description and claims when read in view of the drawings in which:

BRIEF DESCRIPTION OF THE DRAWINGS

FIG. 1 illustrates a radio transmitter for use in controlling a remote device such as garage door;

FIG. 2 is an electrical schematic of the radio control transmitter of the invention; and FIG. 3 illustrates a modification of the invention.

DESCRIPTION OF THE PREFERRED EMBODIMENTS

FIG. 1 illustrates a radio control transmitter 10 which has transmit buttons 11 which can be used to remotely actuate receivers as, for example, a receiver mounted in a garage door operator 12 which controls a door 14 or a receiver mounted in a garage door operator 13 which controls a door 16. FIG. 2 is an electrical schematic of the transmitter 10 and a battery E has one end grounded and the other end connected to a resistor R1 which has its other side connected to first contacts 9a, b, c. The second contacts 8a, 8b and 8c are closed by the switch contacts 11a, 11b and 11c which are momentary switches that are actuatable by the operator of the transmitter. A diode D4 is connected between contacts 8b and 8c and a diode D3 is connected between contacts 8a and 8c. A voltage source is connected to contact 8c which might be 6.2 volts and a capacitor C1 is connected between contact 8c and ground. A diode D2 which may a Zener diode is connected from contact 8c to a diode D1 which has its other side connected to ground. The diode D1 may be a LED. A transistor Q2 has its emitter connected to ground and a resistor R7 is connected between the base of the transistor Q2 and ground. A resistor R6 is connected between the base of the transistor Q2 and the contact 8b. A diode D5 is connected between contact 8a and the collector of transistor Q2. A resistor R8 is connected between the collector of the transistor Q2 and an encoder U1, 22 which is available from Chamberlain Manufacturing Corporation. A code selector switch 17 is connected by leads 23a to h to the encoder 22 and switch contacts 18a through h are movable to three positions with one position in engagement with contacts 19a through h and a second position engageable with contacts 20a through h and in a third position out of contact with the contacts 19 and 20. A resistor R2 is connected between the encoder 22 and ground and a capacitor C2 is connected in parallel with the resistor R2. A lead 24 supplies +6.2 volts to the encoder 22. A lead 26 is connected from the encoder 22 to a resistor R3 which has its other side connected to a lead 21 which is connected to the junction point between inductor L3 and a capacitor C6. The second side of the capacitor C6 is connected to ground and a resistor R5 is connected in parallel with the capacitor C6. A resistor R4 is connected from ground to an inductor L2 which has its other side connected to the emitter of a transistor Q1 and a capacitor C3 is connected in parallel with the resistor R4. The collector of transistor Q1 is connected to a capacitor C4 which has its other side connected to ground and to an inductor L1 which has its other side connected to a lead 27 which is connected to a biasing voltage as, for example, +6.2 volts. A capacitor C5 is connected from ground to lead 27.

In operation, when the transmitter 10 is energized by depressing one of the transmit buttons 11a, 11b or 11c, the radio frequency oscillator of which Q1 forms a part will be energized and drive the antenna L1 to radiate the signal in the 300-400 megahertz range. The inductors L2 and/or the inductor L3 suppresses radiation of harmonics of the radio frequency in the 300-400 megahertz range and, thus, transmitter illustrated in FIG. 2 meets the proposed FCC rules in a simple and inexpensive manner.

FIG. 3 illustrates a modified form of the invention wherein the inductor L3 has been removed and an inductor L4 has been connected in the circuit of the transistor Q1 between the collector and the junction point between the capacitor C4 and the inductor L1. It is to be realized also that inductors L2, L3 and L4 may all be simultaneously used respectively in the emitter base and collector paths of the transistor Q1.

In the circuit according to the invention, the values of the components in the circuit of FIGS. 2 and 3 had the following values, R1, 270 ohms, R2 390 k ohms, R3 33k ohms, Resistor R4 1.0 k ohms, resistor R5 10k ohms, resistors R, R7 and R8 10 k ohms, capacitor C1 was 0.01 microfarads, C2 was 100 picofarads, C3 and C6 was 4 picofarads, C4 was 4.5 picofarads, and C6 was 39 picofarads, L2, l3 and L4 were 80 nanohenries.

It is seen that this invention provides a new and novel radio control transmitter which suppresses harmonic frequencies of the transmitter frequency.

The inductors L2, L3 and/or L4 produce impedances in the emitter, base and collector circuits of the R. F. oscillator which blocks harmonics of the desired radiated frequency (300-400 MHz). The impedance of the R.F. Oscillator at the 300-400 MHz frequencies is generally about 50 ohms but was many times higher at harmonics so that they are substantially blocked.

Although the invention has been described with respect to preferred embodiments, it is not to be so limited as changes and modifications can be made which are within the full intended scope of the invention as defined by the appended claims.

I claim as my invention:

1. A coded radio frequency transmitter for remote control comprising, a transmit switch, an encoder connected to said transmit switch, code selector switches connected to said encoder, a radio frequency oscillator which oscillates at the desired radiation frequency connected to the output of said encoder and including a transistor amplifier and a first inductor connected in the emitter, collector or base circuit of said transistor so as to produce a high impedance to harmonics of said desired radiation frequency, wherein said first inductor is in the emitter circuit of said transistor amplifier, and including a second inductor which causes a high impedance to harmonics of said desired radiation frequency connected in the base circuit of said transistor.

2. A coded transmitter according to claim 1 including a third inductor which causes a high impedance to harmonics of said desired radiation frequency connected in the collector circuit of said transistor.

3. A coded radio frequency transmitter for remote control comprising, a transmit switch, an encoder connected to said transmit switch, code selector switches connected to said encoder, a radio frequency oscillator which oscillates at the desired radiation frequency connected to the output of said encoder and including a transistor amplifier and a first inductor connected in the emitter, collector or base circuit of said transistor so as to produce a high impedance to harmonics of said desired radiation frequency, wherein said first inductor is in the emitter circuit of said transistor amplifier, and a second inductor which causes a high impedance to harmonics of said desired radiation frequency connected in the collector circuit of said transistor.

4. A coded transmitter according to claim 3 including a third inductor which causes a high impedance harmonics of said desired radiation connected in the collector circuit of said transistor.

* * * * *